United States Patent [19]
Okeson et al.

[11] Patent Number: 6,120,399
[45] Date of Patent: Sep. 19, 2000

[54] CONTINUOUSLY VARIABLE TRANSMISSION DRIVEN ELEMENT

[75] Inventors: Shane Okeson, Mahnomen; Richard K. Olson, Lake Park; Brian Eck; Michael Gunderson, both of Bemidji, all of Minn.

[73] Assignee: Product Research and Development, Inc., Bagley, Minn.

[21] Appl. No.: 09/326,869

[22] Filed: Jun. 7, 1999

Related U.S. Application Data

[60] Provisional application No. 60/088,886, Jun. 11, 1998.

[51] Int. Cl.$^7$ .................................................... F16H 51/00
[52] U.S. Cl. ............................................... 474/14; 474/12
[58] Field of Search .................................. 474/8, 11, 12, 474/13, 14

[56] References Cited

U.S. PATENT DOCUMENTS

| | | | |
|---|---|---|---|
| 4,196,641 | 4/1980 | Vogel | 474/19 |
| 4,380,444 | 4/1983 | Dolza | 474/21 |
| 4,585,429 | 4/1986 | Marier | 474/12 |
| 4,969,856 | 11/1990 | Miyata et al. | 474/11 |
| 5,254,041 | 10/1993 | Duclo | 474/14 |
| 5,720,681 | 2/1998 | Benson | 474/10 |
| 5,967,286 | 10/1999 | Hokanson et al. | 192/110 R |

OTHER PUBLICATIONS

Article entitled "Found, the Missing Half of the Secondary Clutch!", SnowTech, pp. 114–119, Sep. 1997.

*Primary Examiner*—Rodney H. Bonck
*Assistant Examiner*—Roger Pang
*Attorney, Agent, or Firm*—Mau & Krull, P.A.

[57] ABSTRACT

The invention is a secondary, or driven, element suitable for use as one element of a three-element continuously variable transmission comprising a primary drive sheave, a V-belt, and the secondary drive sheave. Both sheaves have variable pitch diameters. The pitch diameter of the primary split sheave increases with increasing rotation rate, and the pitch diameter of the secondary split sheave increases as the torque applied to the load increases. The moveable portion of the driven sheave is fitted with a cam in the form of a helix in a hollow cylinder. A roller-type cam follower is mounted perpendicular to the sheave rotational axis on a stub shaft, or spider, that extends radially from the post, an axial extension of the fixed sheave portion. A spring biases the driven sheave portions toward maximum pitch diameter. Increased torque tends to rotate the moveable sheave portion with respect to the shaft and fixed sheave. As the moveable sheave rotates, the cam displaces the moveable sheave toward the fixed sheave. When the torque requirements are lessened, the primary sheave may rotate faster causing the fixed-length V-belt to force the driven sheave faces apart. The roller-spider, cam follower and helical cam assembly act in concert with the spring to provide additional torque when the demand is sensed. This new driven element responds to changing power requirements and loads more quickly and precisely than do previously known CVT secondary elements.

12 Claims, 4 Drawing Sheets

CONTINUOUSLY VARIABLE TRANSMISSION DRIVEN ELEMENT

This application claims benefit of Provisional Application No. 60/088,886 filed Jun. 11, 1998.

BACKGROUND OF THE INVENTION

1. Field of the Invention

The subject matter of the present disclosure relates to the field of continuously variable transmissions (CVT), generally. More specifically, this invention relates to torque-responsive driven elements of belt-type continuously variable transmissions. Most specifically, the invention is a variable pitch driven sheave for operative interconnection by a V-belt with a speed responsive drive sheave to form a variable ratio rotary power transmission system.

The drive (or secondary) sheave element described here may be incorporated into a belt-type continuously variable transmission (CVT) comprising a speed-responsive drive (or primary) sheave, a V-belt, and a torque-responsive driven sheave. An embodiment of the continuously variable transmission driven element of the present disclosure ("driven sheave") is an improved, torque-responsive, CVT secondary sheave that is suited for use in snowmobiles, all-terrain vehicles (ATV's), and in other vehicular and stationary applications.

2. Description of the Prior Art

U.S. Pat. No. 5,720,681 issued Feb. 24, 1998, to Benson for a Torque Responsive Actuation Device. Benson discloses a three-surfaces cam similar to the disclosure of Laughlin, Deschene, and Butterfield et al (U.S. Pat. Nos. 3,605,510, 3,605,511 and 4,216,678, respectively). Benson applies crowned, or laterally radiused, rollers similar to those shown by Steuer (U.S. Pat. No. 3,722,308) to improve driven sheave performance. Sheave faces are biased toward the initial, or minimum separation position by a torsion spring.

U.S. Pat. No. 4,969,856 issued Nov. 13, 1990, to Miyata et al for a Pulley-Type Speed-Shifting Device. Miyata et al discloses a pulley-type transmission that can be manually set at any desired ratio. The structure of the cam follows is similar to that of the disclosed driven sheave cam follower in that a spider with two rollers is used to set the separation of the sheave halves. Engine braking is provided with this transmission system by a tensioner that prevents belt disengagement during operation.

U.S. Pat. No. 4,523,917 issued Jun. 18, 1985, to Schildt for a Variable Pitch Diameter Torque Sensing Pulley Assembly. Schildt discloses a cam-actuated torque-responsive pulley that has two steps in the cam angles. When the sheave faces are between their greatest separation and mid-range (i.e., the effective diameter is small), a low cam angle (e.g., 30°) causes a high axial force to be applied to the belt. When the sheave faces are between mid-range and their closest, the axial force applied against the belt is lower because the cam angle is steeper (e.g. 45°). The cams and cam followers are symmetrical making the pulley bi-directional. An example of the use of the pulley as a drive pulley is given in which the driven pulley is fixed-pitch. The ratio of that system is varied by changing the distance between the driving and the driven shafts.

U.S. Pat. No. 4,378,221 issued Mar. 29, 1983 to Huff et al for a Torque Cam Assembly for Variable Speed Drive and Follower Element therefor. Huff et al disclose a driven sheave that can operate rotating in either direction. Also described is a cam surface-contacting plastic wear button that has a quicker break-in time than some earlier buttons.

U.S. Pat. No. 3,722,308 issued Mar. 27, 1973 to Steuer et al for a Bearing of the Conical Discs of an Infinitely Variable Cone Pulley Transmission. Steuer discloses an improved shape for the rollers that transmit power from the moveable sheave element to the driven shaft. The attempt is to overcome wear of the rollers and inclined ramps on which the sheave spacing adjustment rollers operate. It may be that the design of the disclosed driven sheave element reduces the need for the remedy disclosed by Steuer.

U.S. Pat. No. 3,605,511 issued Sep. 20, 1971 to Deschene for a Self-Cleaning Centrifugal Clutch. Deschene discloses a radially grooved shaft between the two faces of the CVT drive split sheave disclosed by Laughlin. The grooves are said to reduce belt wear when the engine is idling and the vehicle is stopped. In addition, any build-up on the shaft is cleared by operation of the drive sheave.

U.S. Pat. No. 3,365,967 issued Jan. 30, 1968 to Moogk for a Stepless Variable V-Belt Driving Gear With Asymmetric V-Belt. Moogk discloses a pair of rollers that contact cams to maintain constant speed in response to varying torque. A compression spring provides a biasing force against which the rollers and cams act.

U.S. Pat. No. 2,900,834 issued Aug. 25, 1959, to Bessette for an Automatic Variable Speed Pulley. Bessette discloses a V-belt pulley that automatically adjusts the effective diameter of the pulley in accordance with the load applied to it. A moveable split sheave face is moved toward a fixed sheave face by cams acting against radially extending pins. A torsion spring biases the sheave faces toward the initial or starting condition. Rollers in complementary inclined tracks or grooves can be used in place of the pins and cams.

U.S. Pat. No. 2,623,400 issued Dec. 30, 1952, to Davis for a Power Transmission and Centrifugal Clutch. Davis discloses a centrifugal clutch that moves split drive sheave faces toward each other to engage a V-belt. A spring-loaded driven split sheave serves as a belt-tightener.

U.S. Pat. No. 2,276,186 issued Mar. 10, 1942, to Getchell for a Pulley Construction. Getchell discloses a split-sheaved pulley that is much more complex than the design disclosed herein. Both halves of the sheave are moveable on the shaft and all power is transmissed through a spider keyed to the end of a shaft.

SUMMARY OF THE INVENTION

Major elements and sub-assemblies comprising the secondary element, or driven sheave, are shown in the accompanying four figures on four drawing sheets. The driven element incorporates several design improvements that are expected to yield a product with lower manufacturing costs, better performance, and greater reliability than any competing product.

The invention is an improved CVT secondary sheave that is belt-driven by a primary sheave situated on a variable speed power shaft such as a snowmobile or all-terrain vehicle engine. Both the primary and secondary sheaves are split radially so the pitch diameter of the sheave may be varied by sliding a moveable sheave element along the axis of the driven shaft. The effective diameter of both sheaves can be varied by changing the distance between the opposed conical sheave faces. Increasing speed brings the faces of primary sheave closer together thereby effectively increasing the pitch diameter of the drive sheave. Increased load forces the secondary sheave faces closer together (simultaneously forcing the drive sheave faces apart) to increase the engine speed relative to the speed of the load. The usual ratio of this type of CVT can be varied from a low of 3:1 to a high of 0.75:1.

This invention is concerned exclusively with improvements to the secondary (i.e. driven) element of the transmission. Details of three of the elements that distinguish a preferred embodiment of this disclosure from the driven sheaves currently used in commercially available CVT's are shown in the accompanying drawings.

The main components of the new driven sheave are, specifically:

Stationary sheave element (stationary element)
Moveable sheave element (moveable element)
Inner moveable sheave bushing
Outer moveable sheave bushing
Roller/Spider assembly
Track cam, and
Spring The drive sheave stationary portion has a tubular cylindrical center portion, or post, that may be disposed and affixed coaxially upon the driven shaft that extends from the load. A CVT driven element may be installed on many types of driven shafts. Torque-responsive driven elements are commonly installed on jack shafts, transmissions, gear reducers, other rotating linkage to vehicle wheels, tracks, and other ground-contacting component designed to move a vehicle over terrain. The CVT may also be used in stationary applications such as sifters, grain cleaners, fans, pumps, etc. The moveable portion of the driven element has an inner bushing that fits over the cylindrical post of the stationary sheave portion so that the moveable sheave element can slide axially to vary the distance between the belt-engaging conical faces of the two sheave portions.

The spring then slides over the tubular portion of the stationary sheave element to bring one end of it into contact with the inner bushing. The spider ring with rollers slides over the tubular portion of the stationary element so that it contacts the opposite end of the spring. The spider ring is then secured to the tubular portion of the stationary element with a small force of about 50 pounds of pre-load on the spring.

The enclosed track cam has a bushing at the center of its circular face portion that holds the moveable sheave in the proper relationship to the stationary sheave element and the shaft while also allowing the moveable sheave element to slide along the axis of rotation. The cam track is enclosed if used with a compression spring. However, it is understood the track may not be closed if a torsion spring is utilized. The enclosed track cam is installed by sliding it over the hollow cylindrical post of the stationary element, engaging the two enclosed track cams with the two roller-type cam followers, and then affixing the radial disk to the mating portion of the moveable sheave. The roller-type cam followers do not have to roll as sliding would be sufficient. The radial disk of the track cam may be affixed to the moveable sheave by any presently known or subsequently developed fastener, or a plurality of fasteners.

A typically sized CVT assembly might have an eight-inch diameter drive sheave and an eleven-inch diameter secondary sheave. The ratio can vary from 3.25 to 1.0 to 0.75 to 1.0. The effective length of the bushing in the new secondary of that size would be approximately 2½ inches, (the separation between the inner, or first, bushing and the outer, or second, bushing). This broad effective base resists bending forces imposed by the drive belt. Further, in the present invention, the bending moment is applied between the bushings. In comparison, the prior art sliding buttons are much closer to the prior art brass bushing that corresponds to the present inner bushing.

Some commonly available prior art moveable sheave elements transmit power from the belt to the shaft through sliding buttons that contact an open face cam. The cam slopes, the sliding buttons (usually three cams and three sliding buttons), and the torsion spring interacts in response to the load that is being transmitted by the system. Accuracy, precision, and reliability of the axial alignment of the moveable sheave portion with the stationary sheave portion is limited in that type of prior art driven element. An important limitation on alignment accuracy is the imprecision of the fit of the sliding buttons on the open face cam. Shock, imprecise manufacturing, or uneven wear can change the thickness of one or more of the sliding buttons and cause the moveable portion to cant. The resulting variance in the pitch path can increase belt wear, increase vibration, reduce the useful lifetime of the machine and cause other problems.

One problem with cams found in the prior art is that the cams are open, which is to say that cam followers such as the widely available sliding buttons may lose contact with the cam surface if either the speed or load changes rapidly. As a result, sliding button-type cam followers are prone to shock damage when the torsion spring snaps buttons back into contact with the cam slopes.

Another problem with the prior art secondary is that the sheave faces do not always stay in alignment. As alluded to earlier, the belt tension increases with increasing engine speed. At high loads and low speed, belt tension may lift the sliding button from one cam slope and cause the moveable sheave element to become cocked. If belt tension continues to force the sheave faces apart, the subsequent sliding button may, in turn, be lifted from the cam slope and the previous one restored to contact with the cam. The sequence may continue until either the load is reduced or the rotational speed of the sheave increases sufficiently to resist the tendency of the moveable sheave to depart from alignment. The misalignment is unpleasant for the operator, adds stress to the drive train, especially the cam and sliding buttons, causes belt deterioration and accelerates the rate at which the prior art inner bushing and other surfaces wear.

The new enclosed cam assembly incorporated into the new driven element prevents the cam follower rollers from moving out of contact with the cam surface by more than the few thousands of an inch provided for operational clearance, even during rapid changes of speed and load. Keeping the rollers adjacent to the cam slopes prevents most impact-induced shock damage and reduces the potential for premature failure. In addition, the new secondary runs smoother and quieter than do those developed previously. By way of illustration only, the new cam follower rollers may be about ¾" in diameter with ⅜" shafts.

The structural design of the new moveable sheave subassembly separates the load bearing function from the torque-sensing function. A preferred embodiment of the present disclosure maintains coaxial alignment of the moveable sheave element and the stationary sheave element by using two spaced-apart, bushings that are axially slidable upon the cylindrical post. The inner (first) bushing is similar to those used by earlier workers in the field. The new, other (second) bushing replaces the sliding button-type cam followers typically installed with the open-faced, cam ramps typical of commercially available CVT secondary elements. This two-bushing arrangement significantly improved sheave alignment. It is anticipated that this new driven element may have approximately 30% less component misalignment than has been encountered in ordinary specimens of the prior art.

When driven sheave rotation is stopped, compression spring bias positions the moveable element as close as possible to the stationary element. The relative positions of the split-sheave elements are similar to, or identical to the sheave portion configuration when maximum torque is being delivered. As the load decreases and the engine speed increases, the conical belt-contacting faces of the driven sheave move apart to smoothly reduce the pitch diameter of the drive belt path around the secondary sheave.

The drive belt runs between the variable pitch diameter driven sheave conical faces and connects to the drive sheave (not shown) which is frequently mounted on the output shaft of an internal combustion engine which may be mounted in a vehicle. It is to be understood, however, that the drive sheave need not be connected to an engine. Many applications and potential applications for transmissions of the type disclosed herein are for stationary installations such as conveyors, machine drives, compressors, etc.

The drive sheave mounted on the output shaft of an engine (or other prime mover) is responsive to speed—when the drive sheave rotation is slow or stopped, the conical faces of the drive sheave are fully separated so the faces do not engage the loose belt. As the engine speed increases, centrifugal force is used to move the conical drive sheave faces axially and to engage the belt when they are sufficiently close together.

When the drive sheave faces move even closer together, the diameter of the belt path on the drive sheave increases and thus increases the tension on the belt. Increased belt tension forces the driven sheave moveable element away from the driven sheave stationary element by compressing the compression spring. Increasing drive sheave speed can bring the split drive sheave faces to their minimum separation and increase the spacing between the faces of the driven sheave to their maximum separation.

If the load on the driven sheave increases, the enclosed track cam will press the moveable driven sheave element closer to the stationary element. As the driven sheave faces come closer together, the diameter of the belt path over the sheave increases. The longer belt path forces the drive sheave faces farther apart and thereby lowers the output ratio and provides more torque to carry the additional load.

An important advantage of the new secondary is that it allows the use of a compression spring. Compression springs often cost less than torsion springs. In addition, the uniformity and availability of compression springs is much better than that of torsion springs. However, a torsion spring may still be used, and still have the other advantages of the invention.

Advantages of the new roller structures over the prior art slider buttons include the following: only two rollers are required, this roller/spider assembly is easier to make than would be a comparable slider button assembly, and the rollers operate more smoothly with less friction. It is possible to use other numbers of rollers, such as four. However, it is believed that two rollers are preferable in most cases. Further, it would be possible to use only one roller. An advantage of the present invention is the use of less than three (i.e., one or two) rollers. With three or more rollers, there are tolerance problems not associated with one or two rollers.

The conventional bushings of the new secondary may be made of bronze, polymers, or other materials.

The new secondary is more tightly constructed than the prior art, and may easily be supplied as a sealed unit.

DETAILED DESCRIPTION OF THE PREFERRED EMBODIMENT

Figure 1:
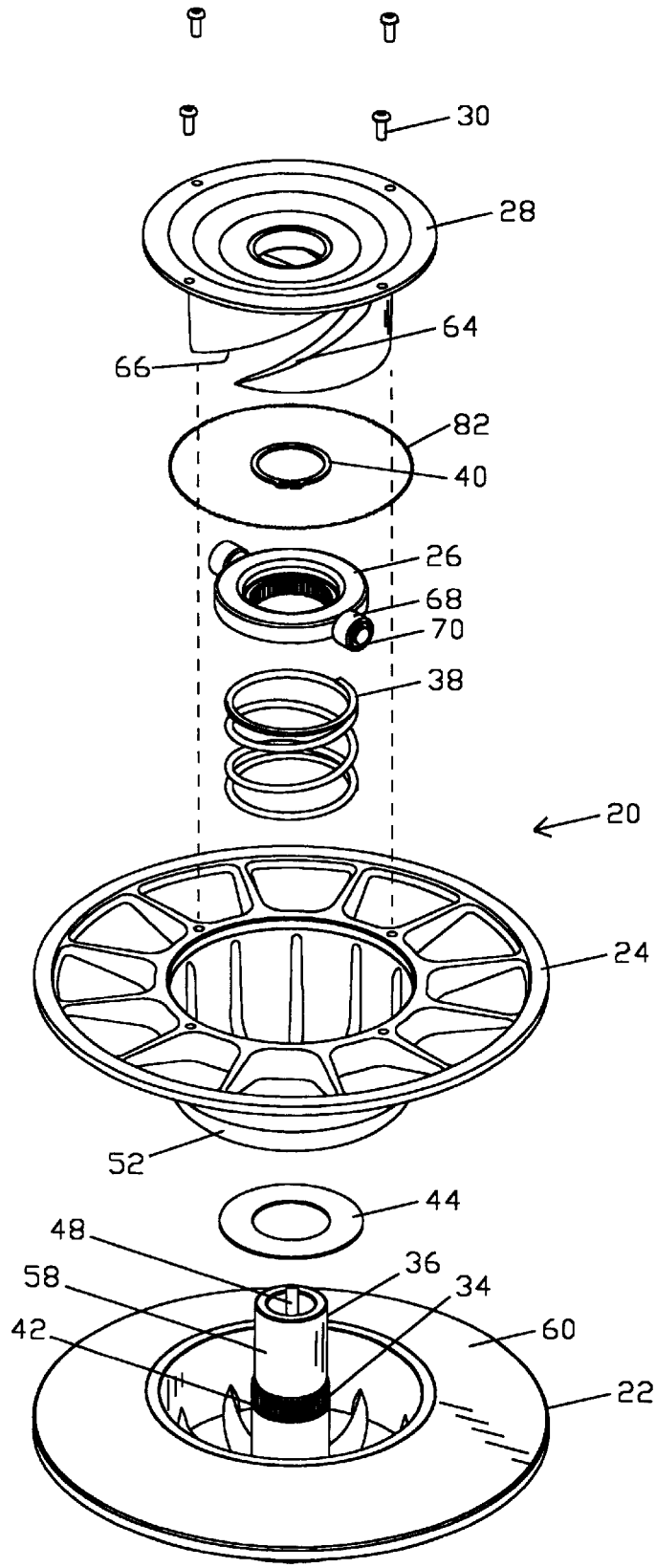
FIG. 1 is an exploded perspective view of an embodiment of the continuously variable transmission driven element.

Viewing first FIG. 1, an exploded perspective of an embodiment of the continuously variable transmission driven element 20, shows a fixed, or stationary, portion 22 of the variable pitch sheave that is spaced apart from a moveable portion 24. A spider 26 and cam 28 assembly that controls the separation of the two sheave portions is retained within the moveable sheave portion 24 by cam attachment screws 30, clamps, clips, or other fasteners.

Internal splines 32, keyway, or other equivalent feature of the spider 26 mate with external splines 34, keyway, or other equivalent feature of the post 36 to rotationally secure the spider 26 to the post 36 during operation. The post 36 is a hollow cylinder that is coaxially affixed to, or integral with, the fixed portion 22 of the continuously variable transmission driven element 20. The bore that extends through the post 36 has a suitable spline or keyway to be used in attaching the post to a drive shaft. While this is the usual manner of connection, it is undertstood the drive shaft could be connected by other methods, well known in the art.

Figure 2:
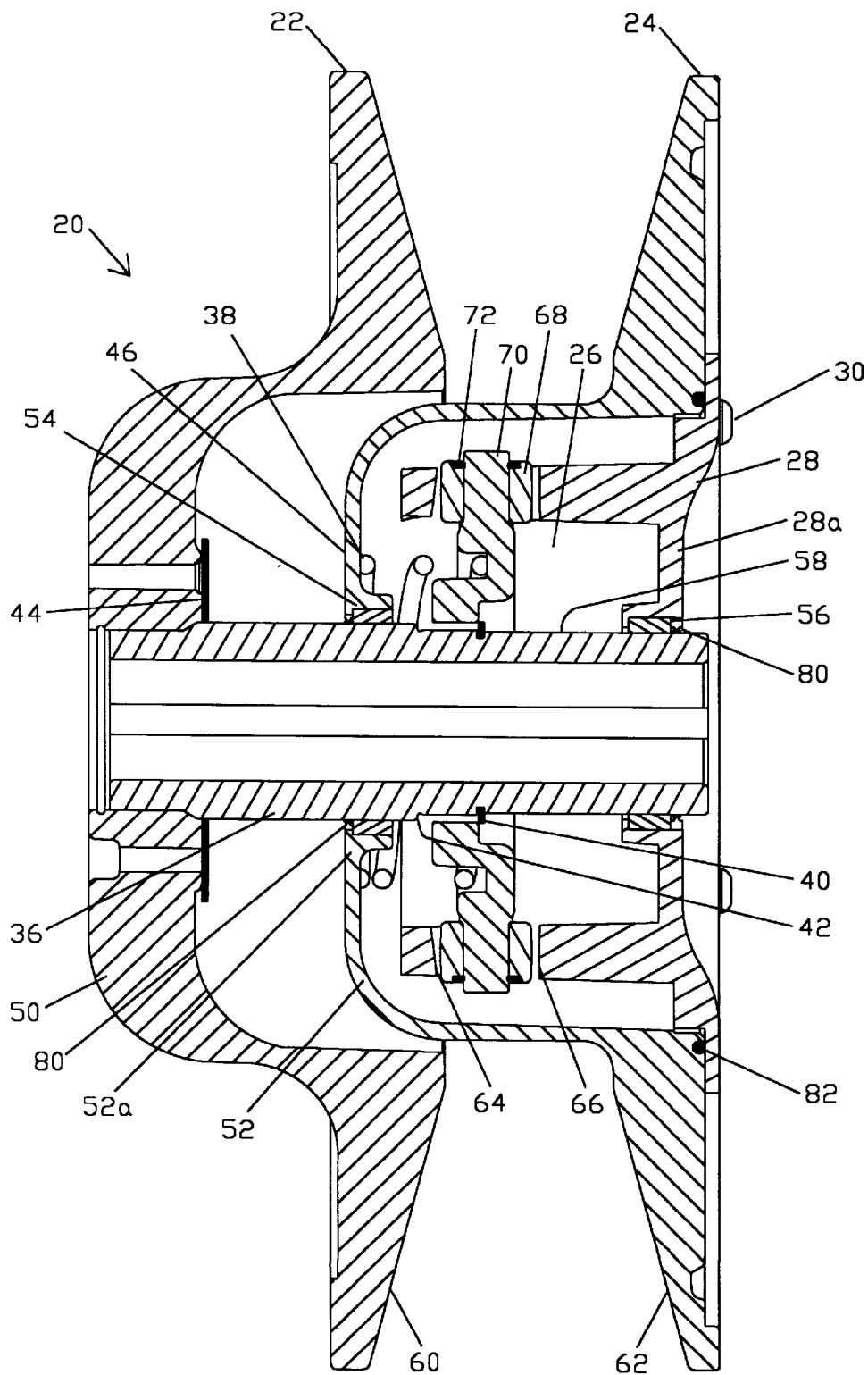
FIG. 2 is a cross-sectional view of the continuously variable transmission driven element of FIG. 1 wherein the sheave is shown in the maximum torque position.

As may more clearly be seen in FIG. 2, the outer end of a coil-type compression spring 38 is disposed against the inner radial face of the spider 26 to bias the moveable portion 24 toward the fixed portion 22. A threaded fastener, pin, snap-ring or equivalent retainer 40, prevents axial spider 26 movement in response to compression spring 38 bias. An optional shoulder 42 on the post 36 may limit spider 26 travel away from contact with the retainer 40.

Figure 3:
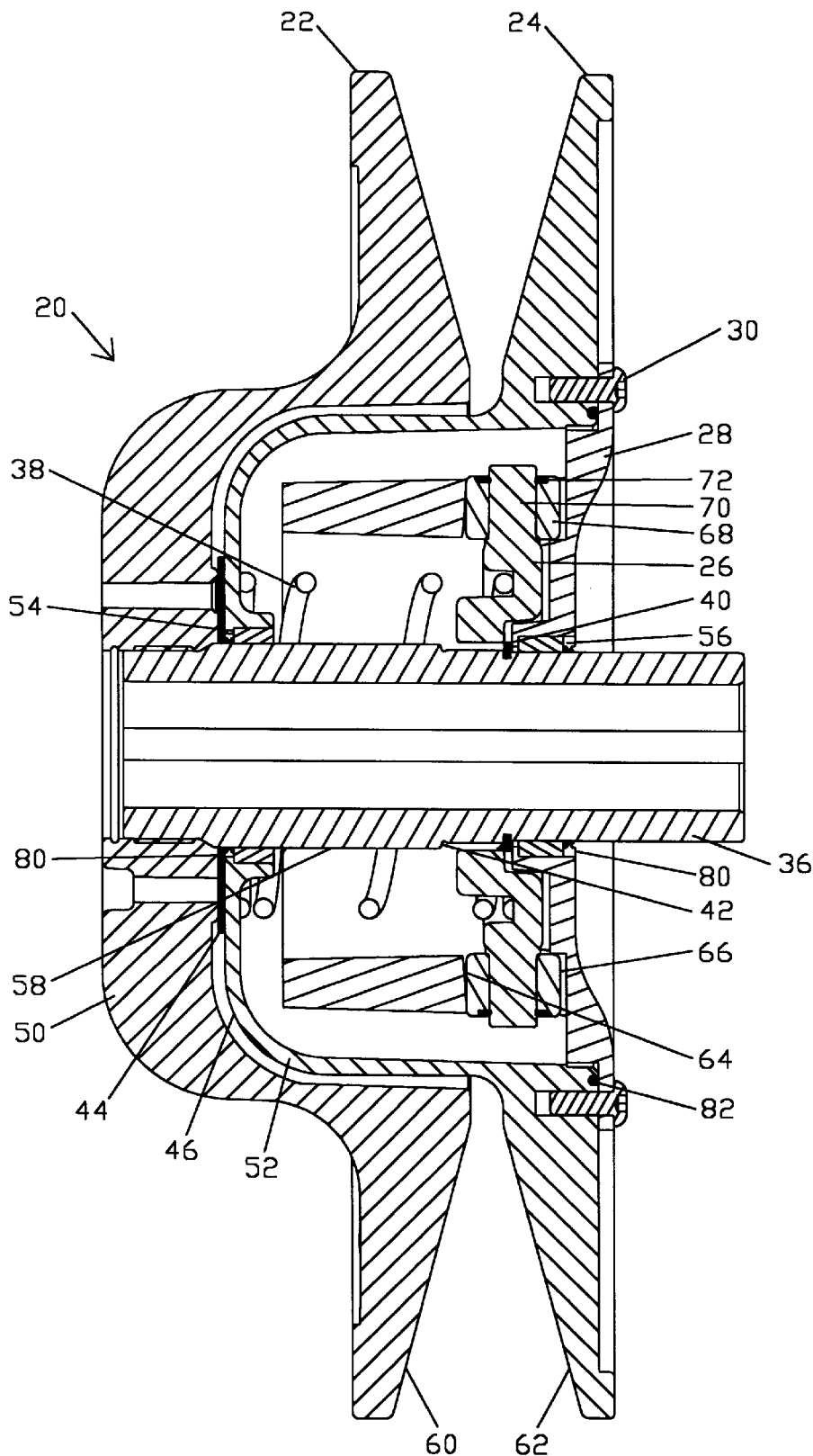
FIG. 3 is a cross-sectional view of the continuously variable transmission driven element of FIG. 2 wherein the sheave is shown in the minimum torque position.

Viewing now FIG. 3, it is shown that a shim 44 may be disposed between the inner, central part of the fixed portion 22 and the outer housing face 46 to limit the maximum pitch to which the driven element 20 can be adjusted. The thickness of the shim 44 can be easily selected to compensate for variations in component fit during manufacture. After the driven element 20 has been installed and used, the thickness of the shim 44 may be reduced to allow the conical belt-contacting faces to move more closely together and thereby compensate for belt wear.

The hollow cylindrical post 36 may be fitted with internal splines or a keyway 48 or other means for preventing the post 36 from rotating with respect to a driven shaft during operation. The post 36 extends inwardly from the central part of the hub 50 of the fixed portion 22 and may be integral with the hub 50 or may be press-fitted, threaded, flange-mounted, or affixed to the hub 50 in any other way.

The central portion of the moveable portion of the embodiment comprises a housing 52 that fits inside the central part of the fixed sheave 22 hub 50. The housing 52 includes a base 52a, a radial face for contacting the shim 44, and thereby serves as an axial movement stop at the minimum separation between the conical belt-contacting faces of the fixed 22 and moveable 24 sheave portions. The housing 52 includes a mount for receiving and holding a first (inner) bushing 54. A second (outer) bushing 56 fits a bore at the center of the base 28a of the cam 28.

It is preferred that the peripheral surface of the post 50 be smoothly finished to create an axial sliding surface 58 along which the bushings may move easily. The diameter of the axial sliding surface 58 may be greater in the region that contacts the first bushing 54 and stepped down at the region that contacts the second bushing 56 in order to accommodate the formation of splines 34 on the post. The post 36 can serve as a mating bearing surface for the first (inner) bushing 54 which is retained by the housing 52 and the second (outer) bushing 56 which is secured to the cam 28.

The first bushing 54 and second bushing 52 are spaced apart sufficiently to allow the bending moment applied by the belt to be resisted and the moment is applied between the bushings. Further, in the present invention, the bending moment resistance by bushing 52 and 54 is separated from the torque sensitive shifting by the cam 28 and spider 26. In the prior art, the same components do both.

The distance between the fixed sheave face 60 and the moveable sheave face 62 varies in response to changes in the torque requirements of the drive system. Two factors affect the distance between sheave faces, and therefore the diameter of circle at which the belt contacts both the fixed sheave face 60 and the moveable sheave face 62, the drive speed response of the speed-responsive drive sheave, and the load applied to the driven shaft.

The response of the present embodiment to variations in the torque applied to the load is to move the moveable shave face 62 closer to the fixed sheave face 60 when the torque increases. When the torque requirement is low, the pitch of a speed-responsive drive sheave can increase, tightening the belt and forcing the moveable sheave face 62 away from the fixed sheave face 60.

Figure 4:
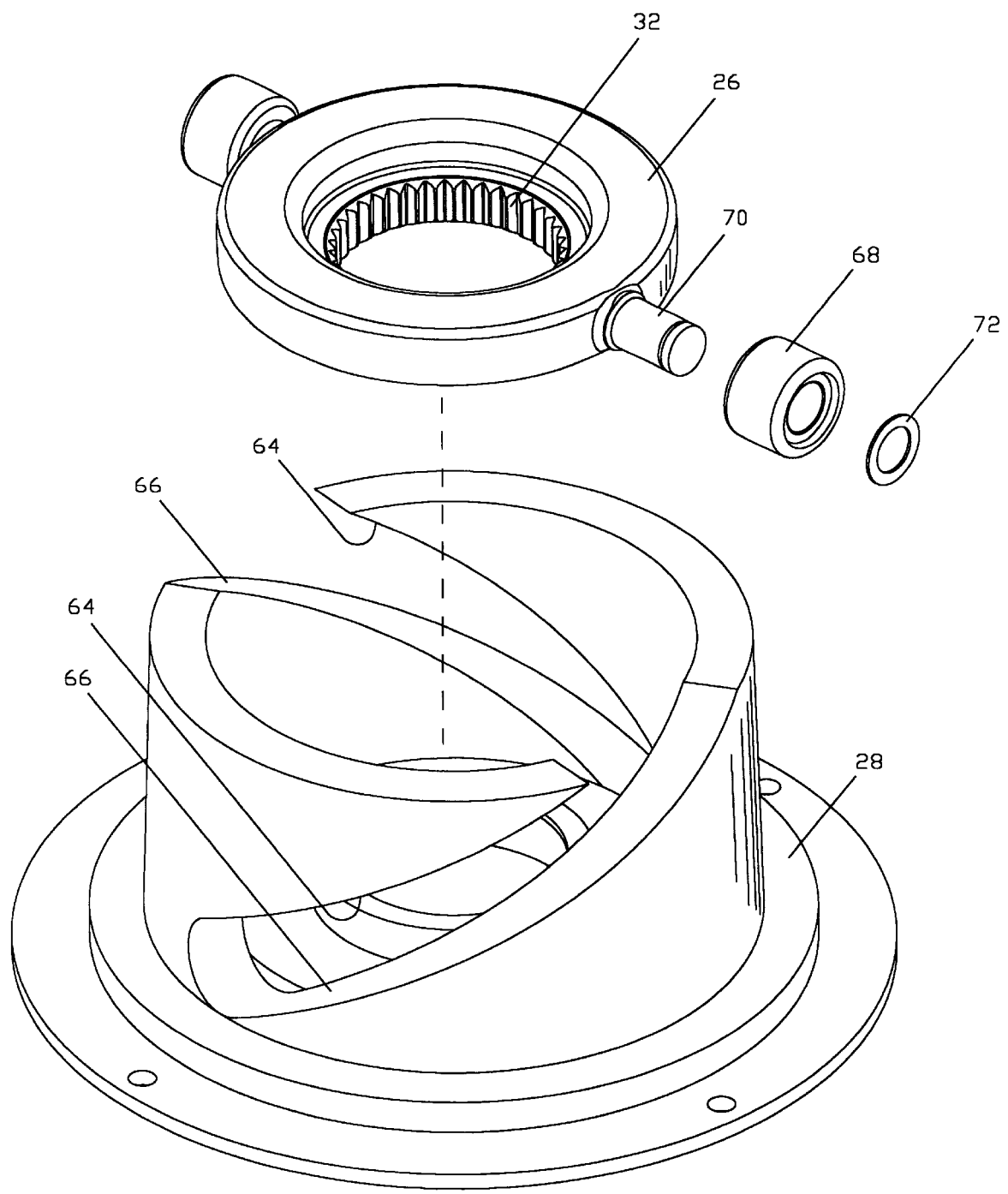
FIG. 4 is an exploded perspective detail view of the cam and spider assembly of the continuously variable transmission driven element of FIG. 1.

The detail of FIG. 4 more clearly shows the mechanism by which the embodiment of the present disclosure works. Torque applied to the driven shaft is communicated by the spider 26 to the motion-producing closed cam 28 that has a diametrically opposed pair of sloped first (inner) cam surfaces 64 spaced-apart from a corresponding pair of diametrically opposed pair of sloped second (outer) cam surfaces 66. A roller 68 fits between each of the corresponding first cam surfaces 64 and second cam surfaces 66. The rollers 68 rotate on a pair of diametrically opposed roller shafts 70. Rollers are secured to the roller shafts 70 by a suitable e-ring, pin, clip or other roller fastener 72. As previously mentioned, it is only necessary that the device at the ends of the shaft slide on the cam track. It is preferred that they roll, but it is not required.

While the cam track is described as having two surfaces 66 and 68, only one surface is necessary if a torsion spring is used. That is, the cam track would not have to be enclosed.

While the spider is described as having two rollers 68, one would be sufficient. While three or more rollers may be used, it is preferred that less than three rollers be used to avoid tolerance concerns where one roller is usually fighting the other two rollers.

Another advantage of the present invention is that the whole shifting mechanism is enclosed and may easily be sealed. An O-ring 82 is positioned between the base 28a and the housing 52. Two piston lip seals 80 are on the post 36. The first lip seal 80 is to the left of the bushing 54. The second lip seal 80 is to the right of bushing 56. The lip seals 80 are shown in FIGS. 2 and 3, but are not shown in FIG. 1. It is understood they would normally appear in FIG. 1, but are clearly indicated in the other figures. The seals 80 and 82 provide for a sealed driven element.

Changes and modifications in the specifically described embodiments can be carried out without departing from the scope of the invention which is intended to be limited only by the scope of the claims that may be appended to this application.

We claim:

1. A continuously variable transmission driven element for mounting on a rotatable shaft and adapted for use in a belt-type continuously variable transmission having a speed-responsive variable pitch sheave drive element operably connected by an endless "V"-belt to the torque-responsive variable pitch sheave driven element, the driven element comprising:

(a) a post fixedly extending coaxially from a hub;

(b) a coaxially-mounted, conical-faced, belt-contacting sheave fixed portion extending radially from the hub;

(c) an axially moveable, generally cylindrical, housing coaxially-mounted on the post, the housing having a base having an outer housing face proximate the hub extending generally radially;

(d) a first post-contacting bushing operatively connected to the housing;

(e) a conical-faced, belt-contacting, coaxially-mounted, moveable sheave portion, disposed away from the base and extending radially outwardly from the housing;

(f) a spring disposable coaxially within the housing over the post, the spring having a first end contacting the outer housing face and a second end contacting a spider disposed within the housing and removable affixed to the post, the spider having:
  (i) less than three radially extending roller shafts; and
  (ii) a sliding member mounted on each roller shaft and engageable with a cam having a base and at least one helically sloped first cam surface extending from the base of the cam, and the axis of the helix described by the cam surface being coaxial with the post; and (g) an axially slidable, coaxial, second bushing spaced from the first bushing.

2. The apparatus of claim 1 wherein the spider further comprises two diametrically opposed roller shafts, each roller shaft being fitted with a cam-engaging roller journaled for rotational mounting on a roller shaft.

3. The apparatus of claim 1, wherein the post is an elongate, hollow, shaft-fitting cylindrical post.

4. The apparatus of claim 1, wherein the spring is a compression spring.

5. The apparatus of claim 4, wherein the sliding member is a removably fastened roller rotatably mounted on the roller shaft, the roller having a diameter.

6. The apparatus of claim 5, wherein the cam further comprises a corresponding helically sloped second cam surface spaced apart from the first cam surface, the space between the first cam surface and the second cam surface providing a clearance for the roller to roll.

7. The apparatus of claim 1, further comprising:

(a) the first bushing positioned proximate the base of the housing; and (b) the second bushing positioned proximate the base of the cam, wherein a bending moment supplied by an endless belt is applied to the fixed sheave and moveable sheave portion is applied between the bushings.

8. The apparatus of claim 1, further comprising:
(a) a first seal positioned between the base of the cam and the housing; and
(b) a piston seal positioned on the post.

9. The apparatus of claim 8, wherein the first seal is an O-ring seal and the piston seal is a first and second piston lip seal.

10. A continuously variable transmission driven element for mounting on a rotatable shaft and adapted for use in a belt-type continuously variable transmission having a speed-responsive variable pitch sheave drive element operably connected by an endless "V"-belt to the torque-responsive variable pitch sheave driven element, the driven element comprising:
(a) an elongated, hollow, shaft fitting cylindrical post fixedly extending coaxially from a hub;
(b) a coaxially-mounted, conical-faced, belt-contacting sheave fixed portion extending radially from the hub;
(c) an axially moveable, generally cylindrical, housing coaxially-mounted on the cylindrical post, the housing having a base having an outer housing face proximate the hub extending generally radially between the housing and a first post-contacting bushing operatively connected to the housing;
(d) a conical-faced, belt-contacting, coaxially-mounted, moveable sheave portion, disposed away from the base and extending radially outwardly from the housing;
(e) a compression spring disposable coaxially within the housing over the cylindrical post, the compression spring having a first end contacting the outer housing face and a second end contacting a spider disposed within the housing and removable affixed to the post, the spider having:
 (i) less than three radially extending roller shafts; and
 (ii) a removably fastened roller rotatably mounted on each roller shaft and engageable with a cam having a base and at least one helically sloped first cam surface extending from the base of the cam, spaced apart from a correspondingly helically sloped second cam surface, the space between the first cam surface and the second cam surface providing a clearance for the roller to roll, and the axis of the helix described by the cam surfaces being coaxial with the post; and
(f) an axially slidable, coaxial, second bushing spaced from the first bushing.

11. The apparatus of claim 10, further comprising:
(a) a first seal positioned between the base of the cam and the housing; and
(b) a piston seal positioned on the post.

12. The apparatus of claim 11, wherein the first seal is an O-ring seal and the piston seal is a first and second piston lip seal.

* * * * *